United States Patent
Taniguchi et al.

[11] Patent Number: 5,876,101
[45] Date of Patent: Mar. 2, 1999

[54] AUTOMOTIVE ANTISKID CONTROL SYSTEM

[75] Inventors: Masahiko Taniguchi, Anjou; Kazuya Maki, Nagoya, both of Japan

[73] Assignee: Nippondenso Co., Ltd., Kariya, Japan

[21] Appl. No.: 908,459

[22] Filed: Aug. 7, 1997

Related U.S. Application Data

[63] Continuation of Ser. No. 475,493, Jun. 7, 1995, abandoned.

[30] Foreign Application Priority Data

Jun. 13, 1994 [JP] Japan .................. 6-130689

[51] Int. Cl.$^6$ ........................................ B60T 8/10
[52] U.S. Cl. .................... 303/146; 303/188; 303/189
[58] Field of Search ................... 303/187, 188, 303/189, 169, 146, 147, 148, 149, 176

[56] References Cited

U.S. PATENT DOCUMENTS

| | | | |
|---|---|---|---|
| 4,005,911 | 2/1977 | Klatt et al. | 303/188 |
| 4,657,314 | 4/1987 | Leiber . | |
| 4,715,664 | 12/1987 | Nakanishi et al. | 303/189 |
| 5,230,550 | 7/1993 | Braschel et al. | 303/169 |
| 5,286,100 | 2/1994 | Takayama et al. | 303/169 X |
| 5,401,082 | 3/1995 | Fuchs et al. | 303/187 |
| 5,407,258 | 4/1995 | Giers et al. | 303/169 X |
| 5,447,364 | 9/1995 | Sakane et al. | 303/169 |

FOREIGN PATENT DOCUMENTS

| | | |
|---|---|---|
| 61-235254 | 10/1986 | Japan . |
| 1-178060 | 7/1989 | Japan . |
| 1-215657 | 8/1989 | Japan . |
| 7-101327 | 4/1995 | Japan . |

*Primary Examiner*—Lee W. Young
*Attorney, Agent, or Firm*—Pillsbury Madison & Sutro LLP

[57] ABSTRACT

Before a wheel to be controlled satisfies conditions to shift to ABS control, when a specified or larger deceleration is caused by applying a brake, a wheel for which the difference in rotational speed from that of a wheel having the maximum rotational speed as the reference is equal to or larger than a predetermined value is subjected to the brake pressure increase restraint. At this time, the magnitude of the estimated lateral acceleration value is determined, and when the vehicle is in a sharp turn, pressure increase rates of the inside wheels are set to be particularly small values.

27 Claims, 9 Drawing Sheets

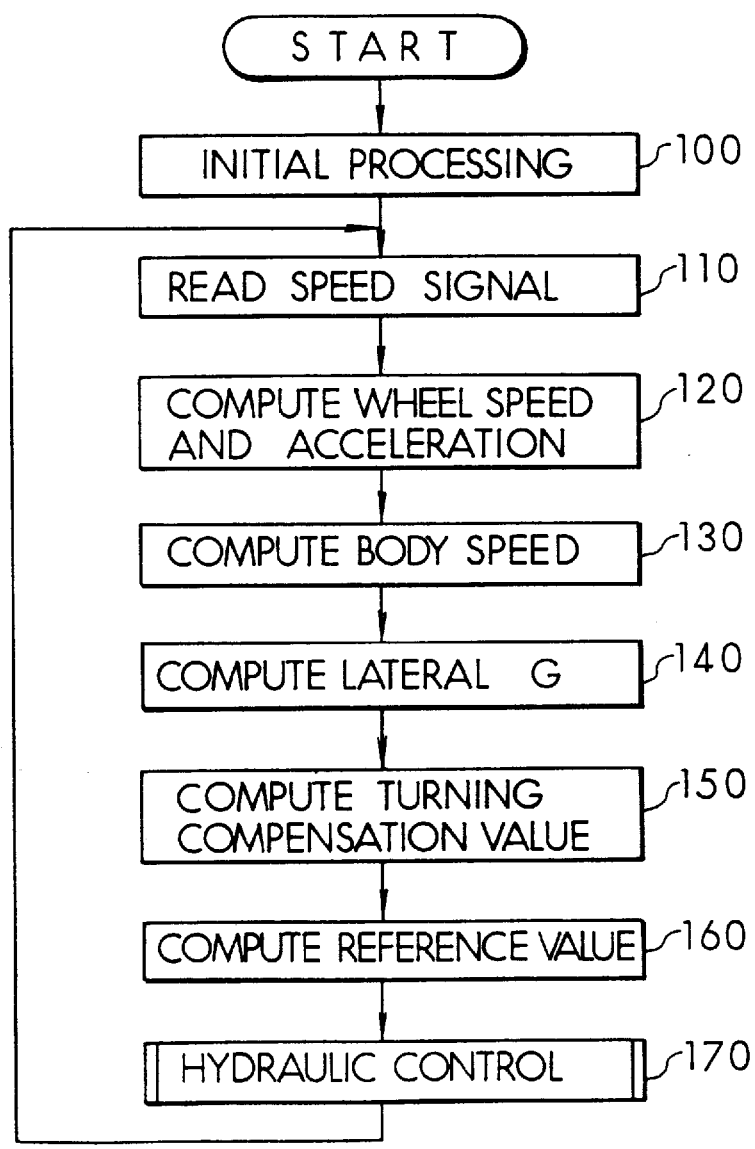

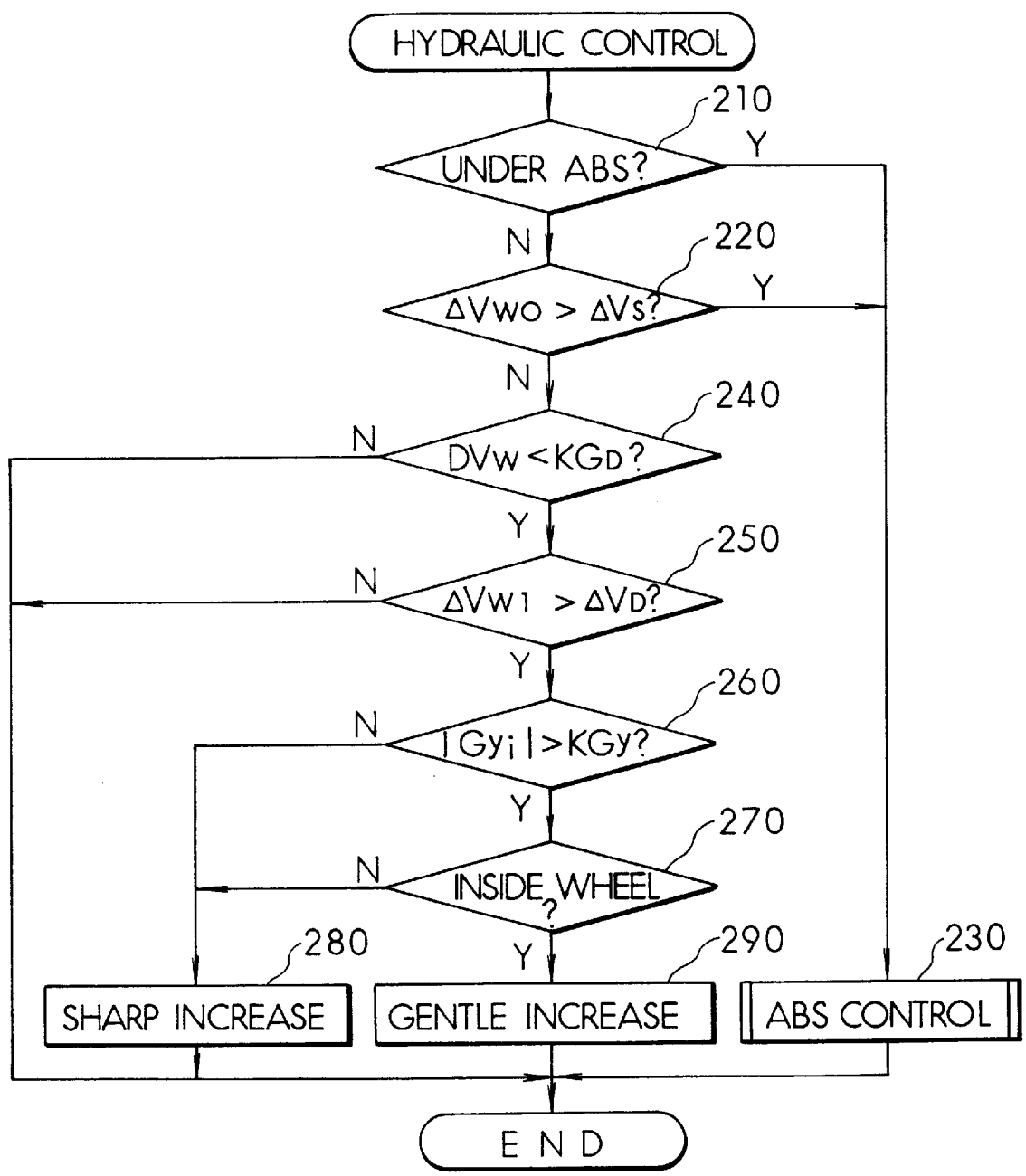

AUTOMOTIVE ANTISKID CONTROL SYSTEM

This is a continuation of application Ser. No. 08/475,493, file Jun. 7, 1995, which was abandon upon filing hereof.

CROSS REFERENCE TO RELATED APPLICATION

This application is based upon and claims priority from Japanese Patent Application No. Hei. 6-130689 filed Jun. 13, 1994, the contents of which are incorporated herein by reference.

BACKGROUND OF THE INVENTION

1. Field of the Invention

The present invention generally relates to an automotive antiskid control system. More particularly, the present invention relates to an automotive antiskid control system which can adjust the brake pressure of each wheel so that the slip state of each wheel can match with the target slip state of each wheel.

2. Related Art

An antiskid control system which can shorten the stopping distance by maintaining the slip state of each wheel to the target slip state while braking has been known. That is, the adjustment of brake pressure is started on condition that the slip state of each wheel has exceeded the target slip state (slip ratio: approximately 20%) and thereby maintaining the slip state of each wheel to the target slip state. Normally, this system is constructed so that the brake pressure corresponding to an amount of brake pedal depression is continuously transmitted as it is to the wheel cylinder of each wheel from the start of braking until the slip state of each wheel exceeds the target slip state.

However, if the vehicle is braked under a condition that load allocation to each wheel is not even, such as if the vehicle is turning, only the driving wheels have snow chains wound therearound or the arrangement of passengers is lopsided, the smaller the load allocated to a wheel is, the earlier this wheel is locked and the earlier the timing of this wheel exceeding the target slip ratio is. For this reason, in the above case, the antiskid control start timing varies from wheel to wheel and the driver has a sense of incongruity, which poses a problem.

Also in such a case where the vehicle is braked while running on a split road or on a road surface like a waste land on which the left wheels and the right wheels have different coefficients of friction on the grounding surfaces, the smaller the coefficient of friction of the road surface is on which a wheel grounds, the earlier the antiskid control starts with respect to this wheel. Therefore, the driver has a sense of incongruity due to the unbalanced control start timing, which poses another problem.

Also when the friction state of each wheel or the air pressure thereof is unbalanced, a difference among the locking tendency of each wheel occurs, which also poses a similar problem.

To counter a problem occurred when the vehicle is braked while turning, in the case where the lateral acceleration when the vehicle is braked while turning becomes equal to or larger than the specified value before the antiskid control starts, such techniques have been proposed as (1) restraining the brake pressure increases of the rear wheels (Japanese Unexamined Patent Publication No. 61-1564), "(2) holding or reducing the brake pressures of the inside turning wheels (Japanese Unexamined Patent Publication No. Hei. 1-178060), and (3) increasing the brake pressures of the inside turning wheels at lower increasing rates than those of the brake pressures of the outside turning wheels (Japanese Unexamined Patent Publication No. Hei. 1-215657). However, these techniques have never been so advanced as to consider the load allocation to each wheel or ease the sense of incongruity of the driver as to the antiskid control start timing as described above.

On the other hand, the applicants for this patent have proposed a technique, as stated in the Japanese Unexamined Patent Publication No. Hei. 7-101327, which is to prevent the unbalanced timing of the antiskid control start among the four wheels when the vehicle is turning. This technique has not yet been publicized as of japanese application date of the present invention, being not a publicized prior art. The purpose of this technique is "for such a system that executes the antiskid control with the antiskid determination value $V_S=0.8V_O$ with respect to the body speed $V_O$ to slightly restrain the brake pressure increase rate of a wheel when the wheel speed of the wheel falls below the first determination value $V_D$ ($V_O>V_D>V_S$) and furthermore to change the pressure increase rate to be more restrained when the wheel speed falls below the second judgment value $V_B$ ($V_O>V_D>V_B>V_S$)". By using this technique, the start timings of the antiskid control for all four wheels can almost be coincided with each other.

However, in this proposed technique, it is conceivable that the brake pressure increases of all the four wheels are restrained. For example, upon the start of braking, all the four wheels may start slipping in the same way. In this case, as the brake pressure increases of all the four wheels are restrained, it is conceivable that the antiskid control is started before the driver obtains the feeling of deceleration as he expected. That is, in the previous proposal of the applicant, it is probable that the sense of incongruity of the driver that the antiskid control start timing is too early can be eliminated and nevertheless a new feeling of congruity that he can not obtain a feeling of deceleration may occur to the driver.

SUMMARY OF THE INVENTION

It is an object of the present invention to eliminate the sense of incongruity of the driver by restraining a time lag in the antiskid control start timing among the four wheels and to prevent a new sense of incongruity from occurring to the driver by eliminating the former feeling of incongruity.

An automotive antiskid control system includes an antiskid condition determining section for determining whether or not each wheel has satisfied conditions to shift to an antiskid control when a vehicle is in a braked state and an antiskid controller for controlling a deceleration state of a wheel determined to have satisfied the conditions to shift to the antiskid control by adjusting a brake pressure of the wheel. Pressure increase restraints restrain a brake pressure increase with respect to a wheel having a predetermined locking tendency before each wheel satisfies the conditions to shift to the antiskid control. Pressure increase restraint prohibitors prohibit a brake pressure increase restraint by the pressure increase restrains with respect to at least one wheel which reaches the predetermined locking tendency later than the other wheel.

The vehicle is braked, before each wheel satisfies the conditions to shift to antiskid control, the brake pressure increase is restrained with respect to the wheel having the predetermined locking tendency. However, when this predetermined locking tendency is caused to all the four wheels, the pressure increase restraint control is prohibited with respect to al least one wheel. Therefore, as it is not possible for the pressure increase restraint control to be always executed with respect to one wheel before each wheel satisfies the conditions to shift to the antiskid control, and the feeling of deceleration to a certain extent can be secured as a whole vehicle.

As a result, according to the antiskid control system of the present invention, it is possible that the sense of incongruity as to the antiskid control start timing is restrained by the pressure increase restraint control and concurrently the vehicle is braked while having a comfortable feeling of deceleration by the pressure increase restraint prohibition control.

It is more preferable, however, that one wheel with respect to which the pressure increase restraint control is prohibited should be a wheel which was last to satisfy the conditions to start the pressure increase restraint control.

The pressure increase for restraining the brake pressure increase with respect to a wheel may operate where a difference in locking tendency from a reference wheel having the weakest locking tendency among of all the four wheels is a predetermined value or before each wheel satisfies the conditions to shift to the antiskid control.

In this situation, when the vehicle is braked, a wheel having the weakest locking tendency among of all the four wheels is braked at the brake depression pressure as it is, and with respect to the other wheels, the brake pressure increase is restrained when the difference in locking tendency from the reference wheel becomes equal to or larger than the predetermined value. Accordingly, the locking tendency of each wheel is controlled toward the locking tendency of a wheel having the weakest locking tendency, and the antiskid control conditions can be obtained without having such a large time lag in the control timing among all the four wheels.

As the brake pressure increase is not restrained with respect to the wheel having the weakest wheel at this time, the feeling of deceleration can be secured to a certain extent as the whole vehicle.

As a result, according to the antiskid control system of the present invention, it is possible to balance the timing of the antiskid control start among all the four wheels without impairing the braked state of the whole vehicle. Accordingly, the driver can brake the vehicle while having a comfortable feeling of deceleration without having any sense of incongruity as to the antiskid control start timing.

The wheel locking tendency can be calculated by using the wheel speed and wheel acceleration, for example, as parameters. However, as the locking tendency itself is sufficient if used as a parameter for the execution of the pressure increase restraint control, there is no need to obtain the locking tendency as an absolute value. Rather it is sufficient that the locking tendency can be used for determining the relative relationship between wheels. Therefore, there is no need to specially define way to obtain the wheel locking tendency.

Wheel speed detectors detect the rotational speed of each wheel, and pressure increase restraints restrain a brake pressure increase with respect to a wheel where a difference in rotational speed from a reference wheel having the maximum rotational speed among of all the four wheels is predetermined value or more before each wheel satisfies the conditions to shift to the antiskid control.

In this situation, the wheel having the maximum rotational speed is braked at the brake depression pressure as it is, and the brake pressure increase for the other wheels are restrained when the difference in rotational speed from the wheel having the maximum rotational speed becomes equal to or larger than the predetermined value. Therefore, the antiskid control condition can be satisfied while the entirely uniform deceleration state is maintained without causing a large difference in rotational speed among all the four wheels. Here, again, as the brake pressure increase is not restrained with respect to the wheel having the maximum rotational speed, the feeling of deceleration can be obtained to a certain extent as the whole vehicle.

Here, the antiskid condition determinator may be constructed so that it determines whether or not each wheel has satisfied the conditions to shift to the antiskid control by using the difference in rotational speed from the wheel having the maximum rotational speed for the reason that normally the body speed coincides with the rotational speed of a wheel having the maximum speed among of all the four wheels. However, when the locking tendencies of all the four wheels are stronger in the case where a road surface has a very small coefficient of friction, etc., the difference between the maximum wheel speed and the actual body speed becomes large. Therefore, when every possible road surface condition is considered, it is preferable, that the automotive antiskid control system further include a speedometer for detecting or estimating a body speed. The antiskid condition determinator then determines whether or not each wheel has satisfied the conditions to shift to the antiskid control based on a difference between the body speed and the rotational speed of each wheel. In this case, the antiskid control can exactly be executed under every possible condition while obtaining desirable deceleration feeling before starting antiskid control.

Further, the automotive antiskid control system can further include a wheel deceleration detector for detecting or estimating the wheel deceleration. Also, the pressure increase restraint can be constructed to restrain the pressure increase only when the wheel deceleration is equal to or larger than a predetermined wheel deceleration.

When formed in this manner as long as the wheel deceleration is not very large, even if the balance of the deceleration state is lost among all the four wheels, the brake pressure increase restraint is not executed. Here, the fact that the wheel deceleration is not large may be interpreted as a state that the driver is gently depressing the brake pedal. Therefore, even if the antiskid control starts earlier with respect to any one wheel, the driver does not have a strong sense of incongruity. Accordingly, it is agreeable to the feeling of deceleration of the driver that all the four wheels are braked with the brake depression pressure as it is without restraining the respective pressure increase rates.

When a wheel having a wheel deceleration valve equal to or larger than the predetermined valve or when the difference in deceleration state from the reference wheel becomes large, the brake pressure increase rate is somewhat restrained. That the wheel deceleration is large may be interpreted as a state that the driver is depressing the brake pedal as if the driver was slamming down on the brake pedal. It is this very moment that if the antiskid control starts too early, the driver may have a strong sense of incongruity.

As described above, by additionally taking the wheel deceleration into consideration as stated in claim 5, it is possible to execute the antiskid control while reducing the sense of incongruity by estimating the brake pedal depressed state and the expectations of the driver about the deceleration to a certain extent.

The automotive antiskid control system may also include a lateral acceleration detector for detecting or estimating the lateral acceleration of the vehicle. The pressure increase restraint can be constructed to change the degree of the pressure increase restraint according to the magnitude of the lateral acceleration. For example, it is possible to increase the degree of the brake pressure increase restraint as the lateral acceleration of the vehicle becomes large. That a large lateral acceleration is being applied to the vehicle may be interpreted as a state that the vehicle is apt to suffer spin. Therefore, it is possible to avoid the above state that may lead to spin by increasing the degree of the pressure increase restraint and thereby improving the road surface grip of each wheel. This arrangement is particularly effective when the brake pedal is slammed down while the vehicle is in turning on a road with a low coefficient of friction.

The automotive antiskid control system can also include a turning direction detector for detecting or estimating the turning direction of the vehicle. The pressure increase restraint can be formed to cause the degree of restraint of increase of the inside wheels to be larger than those of the outside wheels. When the vehicle is braked while turning, normally the tail of the vehicle is apt to sway outside. In this case, however, according to the system stated in claim 7, as the pressure increases of the inside turning wheels within the turning circle are somewhat restrained to be smaller than those of the outside turning wheels, it cause moment to the vehicle to sway the tail of the vehicle inside. Accordingly, it is possible to obtain each effect as described above while preventing the outward sway of the vehicle tail.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 2 is a flow chart illustrating the processing contents of a main routine to be executed by an electronic control circuit;

FIG. 3 is a flow chart illustrating the hydraulic control process to be executed in the step 160 of FIG. 2;

FIGS. 4A to 4C are time chart illustrating the control results when the vehicle is in a sharp turn, wherein FIG. 4A shows a change of wheel speeds, FIG. 4B shows a change in brake fluid pressure of inside and outside wheels, and FIG. 4C shows a change of vehicle deceleration;

FIGS. 5A to 5C are time charts illustrating the control results when the vehicle is in a gentle turn, wherein FIG. 5A shows a change of wheel speeds, FIG. 5B shows a change in brake fluid pressure of inside and outside wheels, and FIG. 5C shows a change of vehicle deceleration;

FIGS. 6A to 6C are time chart illustrating the control results when the vehicle is driving in a straight line, wherein FIG. 6A shows a change of wheel speeds, FIG. 6B shows a change in brake fluid pressure of inside and outside wheels, and FIG. 6C shows a change of vehicle deceleration;

FIGS. 7A to 7C are time charts illustrating the control results when the vehicle is under such conditions that all the four wheels slip, wherein FIG. 7A shows a change of wheel speeds, FIG. 7B shows a change in brake fluid pressure of inside and outside wheels, and FIG. 7C shows a change of vehicle deceleration;

DETAILED DESCRIPTION OF THE PREFERRED EMBODIMENTS

Preferred embodiments of the present invention will be described in detail with reference to the attached figures.

Figure 1:
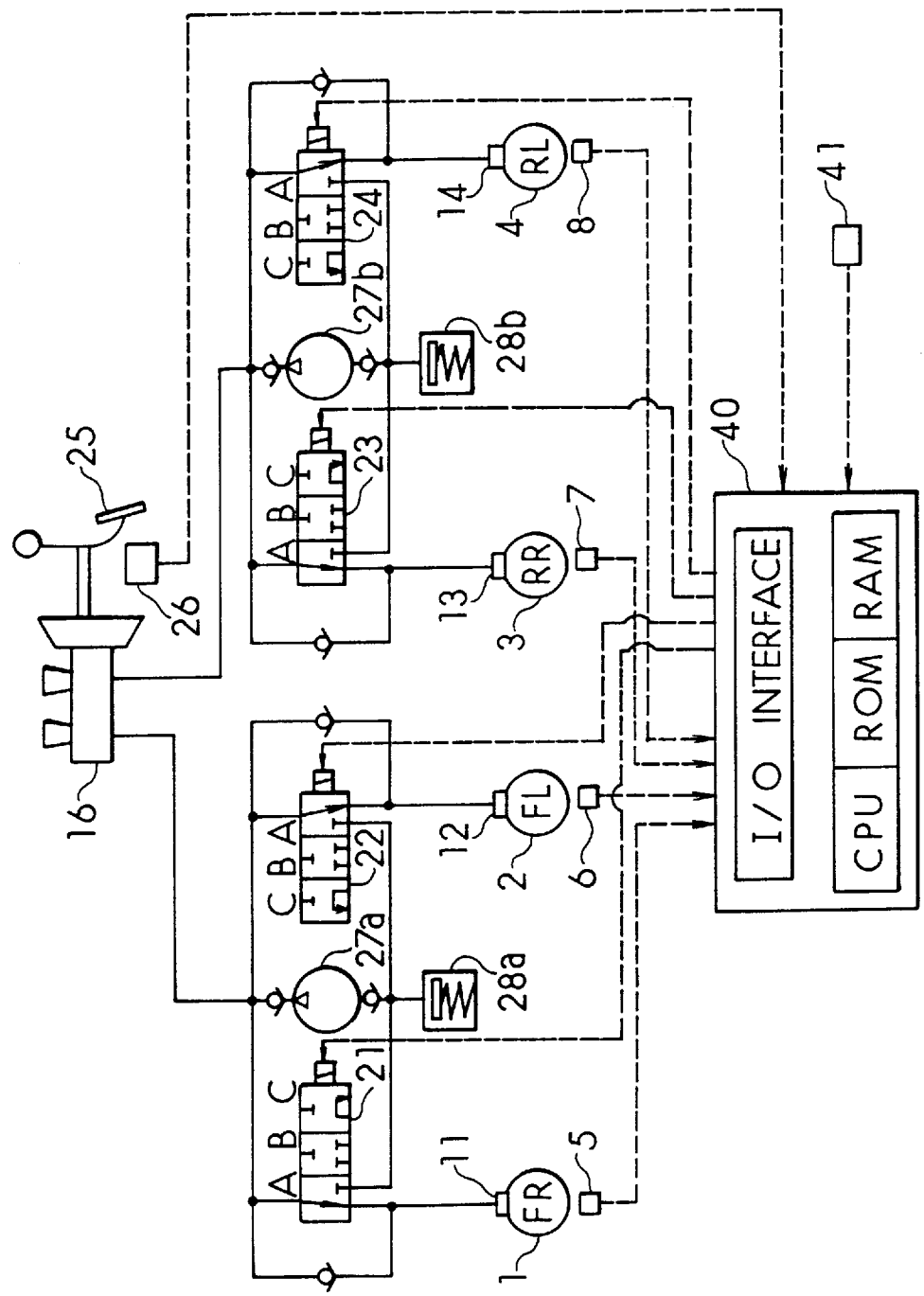
FIG. 1 is a schematic diagram illustrating the overall structure of an antiskid control system according to the first embodiment of the present invention.

FIG. 1 is a schematic diagram illustrating the overall structure of an antiskid controlling system according to a first embodiment to which the present invention is applied. This embodiment is an example of the application of the present invention to a vehicle having a front engine and rear wheel drive (F/R).

As illustrated in FIG. 1, a front right wheel 1, a front left wheel 2, a rear right wheel 3 and a rear left wheel 4 are provided with rotational speed sensors 5, 6, 7 and 8 respectively which generate pulse signals (rotational speed signals) according to the rotational speeds of the respective wheels 1 through 4. As these rotational speed sensor 5 through 8, an electromagnetic type and a magnetic resistance type, for example, can be used.

These wheels 1 through 4 are provided with wheel cylinders 11, 12, 13 and 14 respectively. These wheel cylinders 11 through 14 operate a hydraulic brake system (not illustrated) by using fluid pressure received from a master cylinder 16. The fluid pressure from the master cylinder 16 is sent to the respective wheel cylinders 11 through 14 via actuators 21, 22, 23 and 24 respectively. The fluid pressure from the master cylinder 16 is increased or decreased according to the amount of depression of a brake pedal 25 depressed by a driver. This brake pedal 25 is provided with a stop switch 26 which detects the depression state of the brake pedal 25 and outputs an "ON" signal when the brake is in the applied state or an "OFF" signal when the brake is in the released state.

Each of the above actuators 21 through 24 is comprised of an electromagnetic three-position valve. When not electrically energized, actuators 21 through 24 are controlled to the illustrated state (positions A) respectively. On the other hand, when being electrically energized, these actuators 21 through 24 are switched to positions B or C.

When the actuators 21 through 24 are in the respective positions A, the master cylinder 16 is communicated with the wheel cylinders 11 through 14 respectively. In this state, the brake fluid pressures of the wheel cylinders 11 through 14 are in one-to-one correspondence respectively with the increase or decrease in the fluid pressure of the master cylinder 16. Accordingly, when the brake is in the applied state, the pressure increase mode is executed to increase the brake fluid pressure in correspondence with the fluid pressure of the master cylinder 16.

On the other hand, when the actuators 21 through 24 are repositioned to the respective positions B, the respective brake fluids can not flow in or out of the wheel cylinders 11 through 14, and pressure hold mode for holding the brake fluid pressure is executed. Furthermore, when the actuators 21 through 24 are repositioned to the respective positions C, the brake fluids flow out of the wheel cylinders 11 through 14 into reservoirs 28a and 28b, and thereby pressure reduction mode for reducing the brake fluid pressure is executed.

The brake fluids flowed into the reservoirs 28a and 28b when the mode is changed to the pressure reduction mode, is returned to the side of the master cylinder 16 by hydraulic pumps 27a and 27b. The purpose is to secure the quantity of the brake fluid within a hydraulic circuit so that the brake fluid pressure can be increased immediately after changing the mode from the pressure reduction mode to the pressure increase mode.

The mode change control which controls the respective actuators 21 through 24 to any one of the pressure increase mode, pressure reduction mode and pressure hold mode is executed by an electronic control circuit 40. The electronic control circuit 40 is composed of a microcomputer which is further composed of a CPU, a ROM, a RAM, an I/O interface, etc. When an ignition switch 41 is turned on, the electronic control circuit 40 is started up with the supply of electric power. The electronic control circuit 40 receives signals from the rotational speed sensors 5 through 8 for the respective wheels 1 through 4 and also from the stop switch 26. Upon receiving the signals from the rotational speed sensors 5 through 8 and the stop switch 26, the electronic control circuit 40 performs an operational processing for the control of the braking force based on these signals, and thereby switches the valve positions (modes) of the respective actuators 21 through 24.

Referring to the flow charts in FIGS. 2 and 3, operational processing to be executed by the above electronic control circuit 40 will be described.

FIG. 2 illustrates the processing contents of the main routine to be executed by the electronic control circuit 40.

As illustrated in FIG. 2, when the ignition switch 41 is turned on, the initialization processing such as memory clearance and flag resetting are executed (step 100). Then, rotational speed signals from the respective rotational speed sensors 5 through 8 are read in (step 110). Following this, based on the read rotational speed signals, the rotational speeds of the respective wheels 1 through 4 (hereinafter called "wheel speeds") $V_{WFR}$, $V_{WFL}$, $V_{WRR}$ and $V_{WRL}$ and rotational accelerations of the respective wheels 1 through 4 (hereinafter called "wheel accelerations") $DV_{WFR}$, $DV_{WFL}$, $DV_{WRR}$ and $DV_{WRL}$ which are differential values of the wheel speeds $V_{WFR}$ through $V_{WKL}$ are computed (step 120). Here, the subscripts FR, FL, RR and RL affixed to the respective wheel speeds $V_W$ and wheel accelerations $DV_W$ means that the values are of the front right wheel 1, front left wheel 2, rear right wheel 3 and rear left wheel 4 respectively. Hereinafter, these subscripts are affixed to those values which are obtained for the respective wheels 1 through 4.

Next, based on the maximum speed $V_{Wmax}$ of all the wheel speeds $V_{WFR}$ through $V_{WRL}$ of the respective wheels 1 through 4, and the estimated body speed $V_O$ is computed (step 130).

The above processing is executed by the conventionally well-known steps. For example, whether or not the maximum speed $V_{Wmax}$ of all the wheel speeds $V_{WFR}$ through $V_{WRL}$ of the respective wheels 1 through 4 is within a range from an acceleration limit value $V\alpha$ which was obtained by adding a predetermined value to the previously obtained estimated body speed $V_{O(n-1)}$ to a deceleration limit value $V\beta$ which was obtained by subtracting an another predetermined value from the estimated body speed $V_{O(n-1)}$ is determined. If the maximum speed $V_{Wmax}$ is within the range from the acceleration limit value $V\alpha$ to the deceleration limit value $V\beta$, the maximum speed $V_{Wmax}$ is set as; if the estimated body speed $V_O$; if the maximum speed $V_{Wmax}$ is above the acceleration limit value $V\alpha$, this acceleration limit value $V\alpha$ is set as the estimated body speed $V_O$ and if the maximum speed $V_{Wmax}$ is below the deceleration limit value $V\beta$, this deceleration limit value $V\beta$ is set as the estimated body speed $V_O$.

As the next step, the estimated value of lateral acceleration (estimated lateral G value) $G_{yi}$ caused to the vehicle is calculated (step 140). This estimated lateral G value $G_{yi}$ is calculated based on the wheel speeds $V_{WRR}$ and $V_{WRL}$ of the rear wheels 3 and 4, by using the following equation:

$$G_{yi} = \frac{1}{2} \times \frac{V_{WRR} - V_{WRL}}{TR} \times \frac{V_{WRR} + V_{WRL}}{2} \quad \text{EQUATION 1}$$

Here, TR is the axle length of the rear wheels.

After the estimated body speed $V_O$ and the estimated lateral G value $G_{yi}$ are obtained as described above, turning compensation values $\Delta V_{WOFR}$, $\Delta V_{WOFL}$, $\Delta V_{WORR}$ and $\Delta V_{WORL}$ are calculated which are used for setting the control reference value for slip ratio determination for the respective wheels 1 through 4 (step 150).

These turning compensation values $\Delta V_{WOFR}$ through $\Delta V_{WORL}$ are values set to compensate for the deviations of the body speeds in mounted positions of the respective wheels 1 through 4 from the estimated body speeds $V_O$ obtained in the above step 130 when the vehicle is in turning. In this embodiment, these values are set by obtaining the deviations of the wheel speed $V_{WRL}$ of the rear left wheel 3 or wheel speed $V_{WRR}$ of the rear right wheel 4, whichever larger value $V_{WRmax}$, from the wheel speeds $V_{WFR}$ through $V_{WRL}$ of the respective wheels 1 through 4 when the stop switch 26 outputs the "!OFF" signal, i.e., when the brake is not in the applied state. This can be reiterated as follows:

When the brake is not in the applied state, the wheel speeds $V_{WFR}$ through $V_{WRL}$ of the respective wheels 1 through 4 are almost equal to the body speed at the respective wheel mounted positions, and the wheel speeds of the respective inside turning wheels are lower than those of the respective outside turning wheels when the vehicle is turning. Therefore, in the step 150, the deviations of the wheel speeds $V_{WFR}$ through $V_{WRL}$ of the respective wheels 1 through 4 from the wheel speed $V_{WRL}$ of the rear left wheel 3 or wheel speed $V_{WRR}$ of the rear right wheel 4, whichever larger value $V_{WRmax}$, are obtained, then the deviation of body speed in each wheel position is obtained according to the turning angle of the vehicle immediately before the brake is applied, and then these deviations are set as the turning compensation values $\Delta V_{WOFR}$ through $\Delta V_{WORL}$ of the respective wheels 1 through 4.

After the turning compensation values $\Delta V_{WOFR}$ through $\Delta V_{WORL}$ of the respective wheels 1 through 4 are obtained, the control reference values $V_{WOFR}$, $V_{WOFL}$, $V_{WORR}$ and $V_{WORL}$ corresponding to the body speeds in the respective mounted positions of the respective wheels 1 through 4 are computed by subtracting the turning compensation values $\Delta V_{WOFR}$ through $\Delta V_{WORL}$ of the respective wheels 1 through 4 from the estimated body speed $V_O$ (step 160).

Following the above, slip conditions when the vehicle is in the brake applied state are determined for the respective wheels 1 through 4 based on the control reference values $V_{WOFR}$ through $V_{WORL}$ of the respective wheels 1 through 4, the wheel speeds $V_{WFR}$ through $V_{WRL}$ of the respective wheels 1 through 4, and the wheel accelerations $DV_{WFR}$ through $DV_{WRL}$ of the respective wheels 1 through 4, the hydraulic control processing are executed to control the brake fluid pressure, and the process returns to the step 110 (step 170).

Next, the hydraulic control processing executed for the wheels 1 through 4 respectively in the above step 170 will be described along the flow chart in FIG. 3. Here, as exactly the same hydraulic control processing is executed for all the wheels 1 through 4 in the step 170, hereinafter only the hydraulic control processing to be executed for any one of the wheels 1 through 4 will be described. Also hereinafter, the subscripts FR through RL will be omitted.

The hydraulic control processing is executed when the stop switch 26 outputs the "ON" signal, i.e., when the vehicle is in the braked state. When the hydraulic control processing starts, a determination is made with respect to the wheel which becomes an object of the hydraulic control whether or not the antiskid control (ABS control) has already been executed for the wheel (step 210). When it is determined that the ABS control is now being executed, the process proceeds to the step 230. In the step 230, the actuator is driven so as to control the slip ratio of this wheel to the target slip ratio, and the well-known ABS control is executed to upwardly or downwardly control the brake fluid pressure by changing the mode between the above pressure increase mode, the pressure hold mode and the pressure reduction mode.

On the other hand, when it is determined that the ABS control has not yet been executed (step 210=NO), another determination is made whether or not the deviation $\Delta V_{WO}$ of the current wheel speed $V_W$ from the estimated body speed $V_O$ obtained in the above step 130 is larger than the predetermined ABS control start determination value $\Delta V_S$ and whether or not the wheel acceleration $DV_W$ is lower than the specified ABS control start deceleration $G_S$ (step 220). When it is determined in this determination that the deviation $\Delta V_{WO}$ is larger than the predetermined ABS control start determination value $\Delta V_S$ and the wheel acceleration $DV_W$ is lower than the ABS control start deceleration $G_S$, the process proceeds to the above step 230 to start the ABS control.

It should be noted here that the ABS control start determination value $\Delta V_S$ is a value designed to determine whether or not the wheel slip ratio is larger than the target slip ratio of the ABS control (approximately 20%). In this step 220, when the wheel speed $V_W$ falls from the control reference value $V_{WO}$ indicating the body speed at the mounted position of this wheel below the determination value $\Delta V_S$, it is determined that slip has been caused to the wheel, and the process proceeds to the ABS control of the step 230. That is, the difference between the $\Delta V_{WO} = V_{WO} - V_W$ and $\Delta V_S$ is measured to determine whether or not this wheel should satisfy the conditions to shift to the ABS control.

When the determination is "NO" in the step 220, i.e., $\Delta V_{WO} \leq V_S$, a determination is made whether or not the wheel acceleration $DV_W$ of this wheel is equal to or smaller than the predetermined negative acceleration, i.e., the reference deceleration $KG_D$ ($KG_D \geq GS$), that is, whether or not the wheel is being decelerated at a deceleration larger than the reference deceleration $KG_D$ (step 240).

When the determination is "NO" in the step 240, i.e., when $DV_W \geq KG_D$, it can be determined that the wheel firmly holds the road surface and there is no possibility of slip, and therefore the process is terminated without any further processing.

On the other hand, when the determination is "YES" in the step 240, i.e., when $DV_W < KG_D$, another determination is made whether or not the deviation of each wheel speed $V_W$ from the wheel speed of the wheel having the maximum rotational speed $V_{Wmax}$, i.e., $\Delta V_{W1} = V_{Wmax} - V_W$, is larger than the predetermined reference value $\Delta V_D$ (step 250). This reference value $\Delta V_D$ is set to approximately several kilometers per hour, for example.

When the determination is "NO" in the step 250, i.e., when $\Delta V_{W1} \leq \Delta V_D$, as it can be determined that this wheel has not so much deviation in rotational speed compared with the wheel having the maximum rotational speed, the process is terminated without any further processing.

On the other hand, when the determination is "YES" in the step 250, i.e., when $\Delta V_{W1} > \Delta V_D$, another determination is made whether or not the absolute value of the estimated lateral G value $G_{yi}$ is larger than the preset sharp turning judgment acceleration $KG_Y$ (step 260). When the absolute value $|G_{yi}|$ of the estimated lateral G value of the vehicle is not larger than the sharp turning judgment acceleration $KG_Y$, it is determined that the vehicle is in a straight running or, even if the vehicle is turning, in a gentle turning with no room for a large slippage caused to the inside turning wheels within the turning circle, and the process proceeds to the step 280 to execute the sharp fluid pressure increase control.

This sharp fluid pressure increase control is a control in which the valve position of the actuator of this wheel is switched between the pressure increase mode and the pressure hold mode at a specified duty ratio by outputting a pressure increase signal with the specified duty ratio to the actuator so that the brake fluid pressure can be increased at a moderate speed which is slower than the speed when the actuator is not being electrically energized.

On the other hand, when the absolute value $|G_{yi}|$ of the estimated lateral G value of the vehicle is larger than the sharp turning judgment acceleration $KG_Y$, it can be determined that a large slippage may be caused to the inside turning wheels within the turning circle. Furthermore, a determination is made whether the vehicle is in a clockwise turning or in a counterclockwise turning based on the positiveness or negativeness of the estimated lateral G value $G_{yi}$, and based on that determination it is further determined whether or not the wheel currently under the control is an inside turning wheel (step 270). When the wheel currently under the control is not an inside turning wheel, the process proceeds to the step 280 to execute the sharp fluid pressure increase control.

However, when the wheel currently under the control is an inside turning wheel, the process proceeds to the gentle fluid pressure increase control (step 290).

Here, the gentle fluid pressure increase control is a control in which the actuator is electrically energized so that the pressure holding mode can be executed during a duty cycle longer than the sharp fluid pressure increase control and the brake fluid pressure can only be increased more gently than the sharp fluid pressure increase control.

As described above, according to the present invention, before each wheel satisfies the conditions to shift to the ABS control, when the wheel acceleration $DV_W$ is smaller than the predetermined deceleration $KG_D$, i.e., the brake is being applied with the predetermined or larger deceleration and when the difference in rotational speed of the wheel speed from the wheel having the maximum wheel speed (maximum speed wheel), $\Delta V_{W1}$, becomes several kilometers per hour or more, the increase rate of the brake fluid pressure is reduced (step 280). Therefore, the brake power of the wheel having a larger deceleration among of all the four wheels becomes relatively weaker, and deceleration of the wheel becomes small, and the deceleration state of all the four wheels come to match the deceleration state of the maximum speed wheel. If the vehicle is in the sharp turning state at this time, the increase rate of the brake fluid pressure of the inside turning wheel is caused to be smaller than that of the outside turning wheel within the turning circle (step 290). This is to counter the phenomenon that when the vehicle is in a sharp turn, the inside turning wheels have smaller load allocations and as much quickly the inside turning wheels are apt to be locked, and therefore the inside turning wheels decelerate considerably quickly than the maximum speed wheel (normally an outside turning front wheel) does.

The above control effect will further be described referring to a timing chart.

Figure 4A:
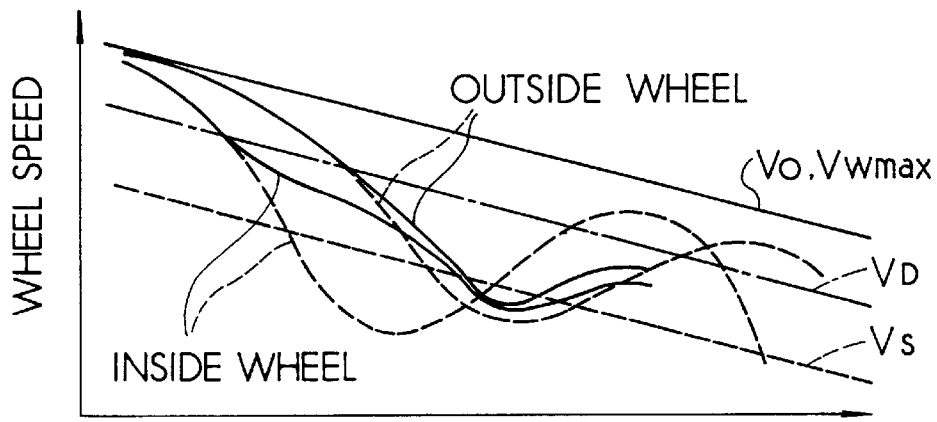
Figure 4B:
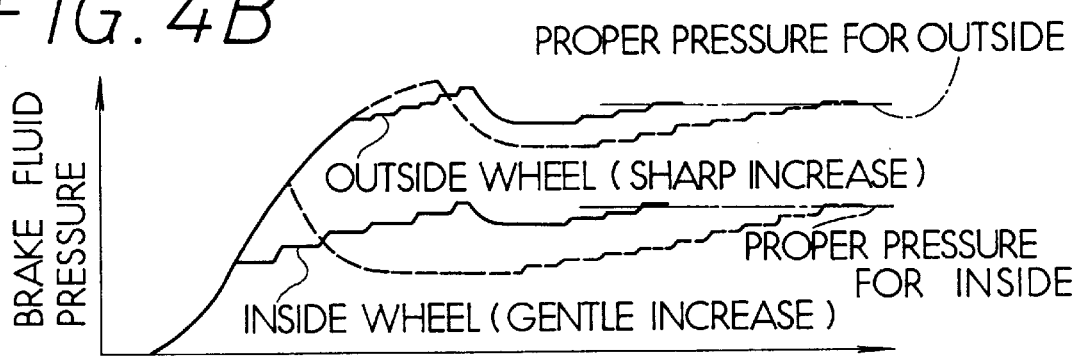
Figure 4C:
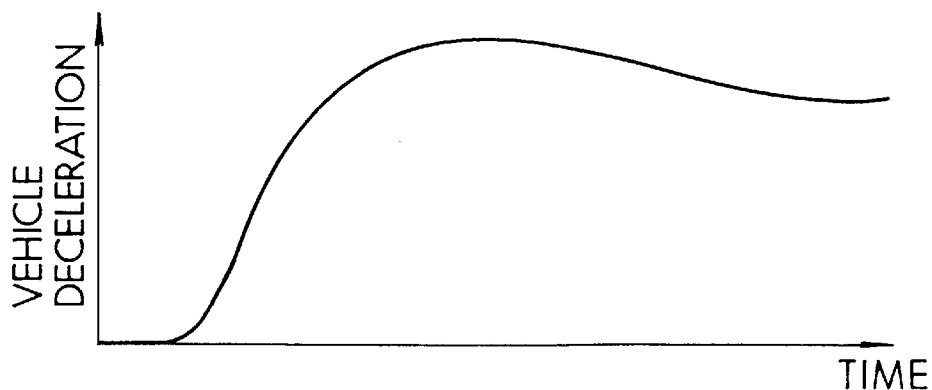

An example of the control effect when the brake is applied to the vehicle in a sharp turn, i.e., when the estimated lateral G value is large, is illustrated in FIGS. 4A to 4C.

When the brake application starts, the body speed $V_O$ starts reducing. Normally, this body speed $V_O$ is almost the same as the wheel speed $V_{Wmax}$ of the maximum speed wheel (an outside turning front wheel) as illustrated in FIG. 4A. On the other hand, as the inside turning wheels are apt to easily slip and to be locked, the inside turning wheels decelerate relatively quickly. However, when the outside turning wheels decelerate more than the maximum speed wheel speed $V_{Wmax}$ by $\Delta V_{W1}$ and the wheel speed thereof falls below $V_D$, the above gentle fluid pressure increase control (step 290) is executed, and from then a drop in the wheel speed is very gentle. On the other hand, as the outside turning rear wheel is apt to easily locked than the maximum speed wheel (the outside turning front wheel), the outside turning rear wheel decelerates relatively quicker than the maximum speed wheel does. Although the deceleration rate is more gentle than that of the inside turning wheels. Therefore, the wheel speed curves of the outside turning wheels come under the $V_D$ line at a timing later than the timing when the wheel speed curves of the inside turning wheels come under the $V_D$ line. Subsequently, the sharp fluid pressure increase control is executed in the step 280, and thereby the deceleration comes to be more gentle than ever before. At the same time, the timing when the wheel speed curves of the inside turning wheels and outside turning rear wheel come under the $V_S$ line, which is a starting condition of the ABS control, comes to be sufficiently later compared with a case where the gentle fluid pressure increase control or the sharp fluid pressure increase control is not executed (as indicated by dot lines in FIGS. 4A and 4B). As a result, the body speed has sufficiently lowered by the time when the ABS control starts, there is no possibility that the ABS control starts earlier than the driver expects, and therefore the driver can brake the vehicle while having a good feeling of deceleration.

Furthermore, as evident in comparison of the brake fluid pressure change between the solid lines and the dot lines in FIGS. 4A and 4B, the undershoot of the wheel speed at the time when the ABS control starts is small. Therefore, the period of time until each wheel obtains the proper fluid pressure in the antiskid control is short. That is, according to this embodiment, it is also possible that after the ABS control starts, the brake fluid pressure of each wheel can quickly be adjusted to the proper fluid pressure level.

Figure 5A:
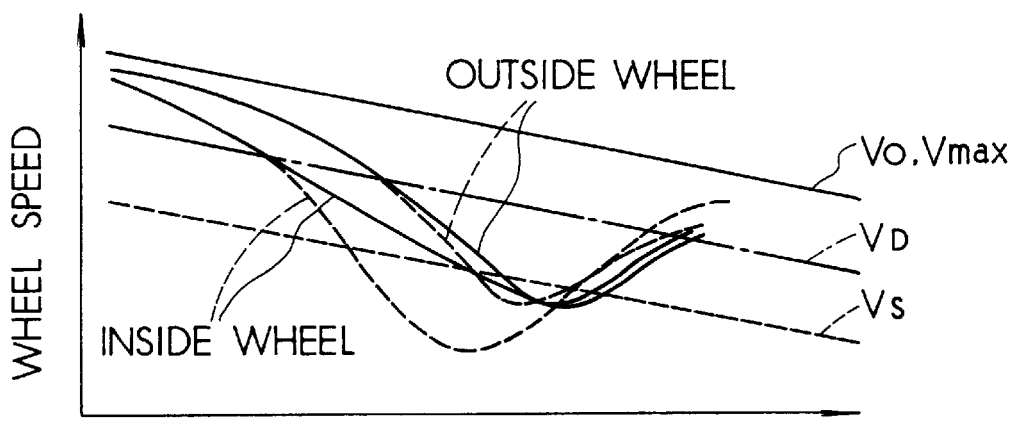
Figure 5B:
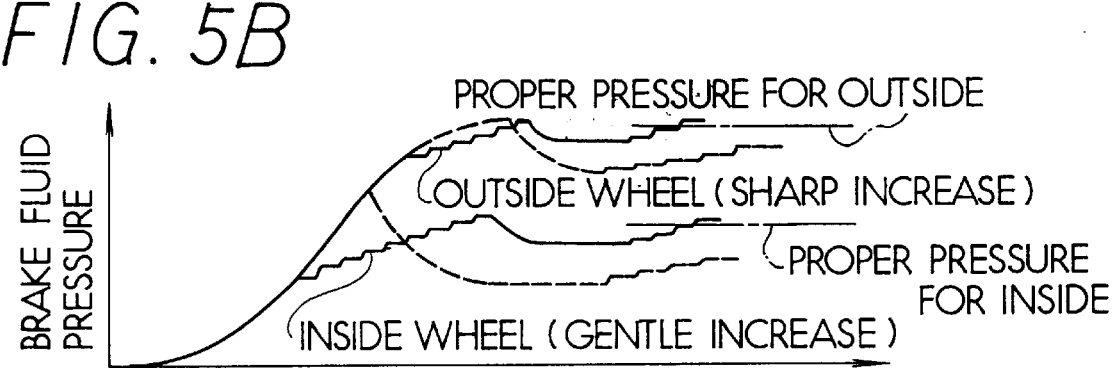
Figure 5C:
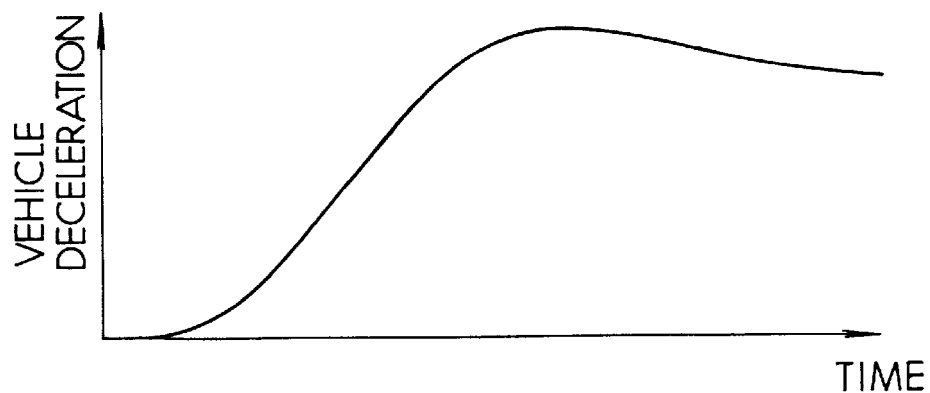

Next, an example of the control effect when the estimated lateral G value is small, i.e., when the vehicle is in a straight running or a gentle turning, the brake is applied is illustrated in FIGS. 5A to 5C. In this case, the gentle fluid pressure increase control is not executed for the inside turning wheels, either. The reason for this is that as no large slip is caused to a specific wheel in this case, the brake fluid pressure of each wheel can properly controlled only by applying the sharp fluid pressure increase control. In other words, when speed difference is caused between the left wheels and the right wheels by the gentle turning of the vehicle, the sharp fluid pressure increase control is executed for each wheel according to the degree of a fall in each wheel speed as illustrated in FIGS. 5A and 5B. In this case, again, the ABS control start timing is controlled not to be too early and the brake fluid pressure of each wheel can gently be adjusted to the proper fluid pressure level after the ABS control starts.

Figure 6A:
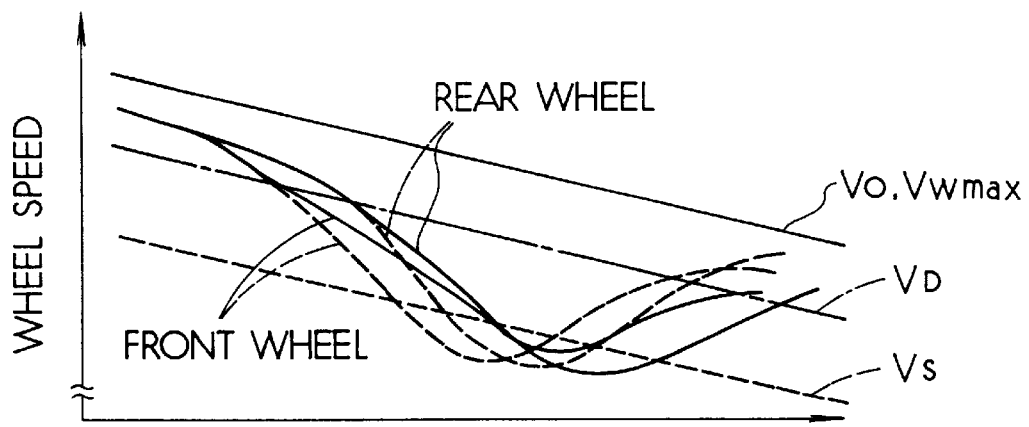
Figure 6B:
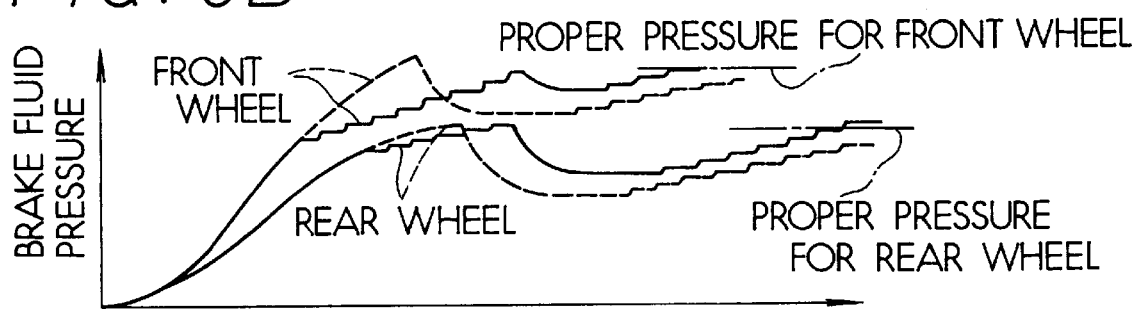
Figure 6C:
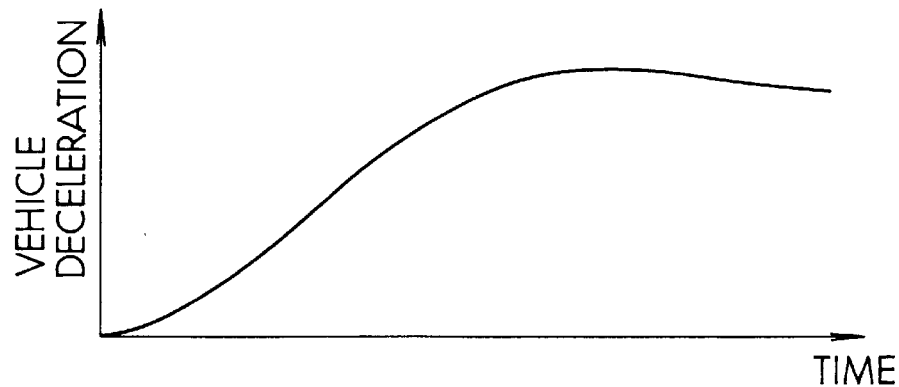

An example of the control effect when the speed difference is caused between the front wheels and the rear wheels due to the inclination of the road surface or the like when the vehicle is in a straight running is illustrated in FIGS. 6A to 6C. Also in this case, it is possible that the ABS control starts after the body speed has sufficiently fallen, and therefore there is no possibility that the ABS control start timing becomes earlier than the driver expects.

Figure 7A:
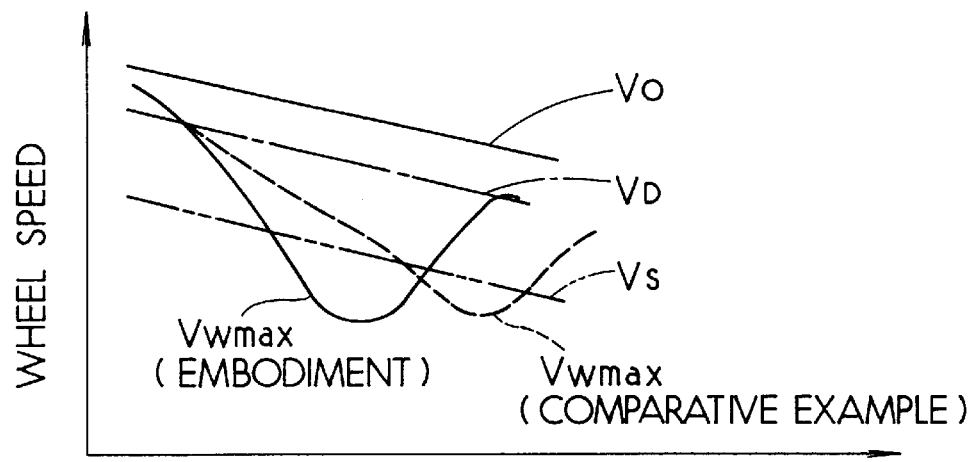
Figure 7B:
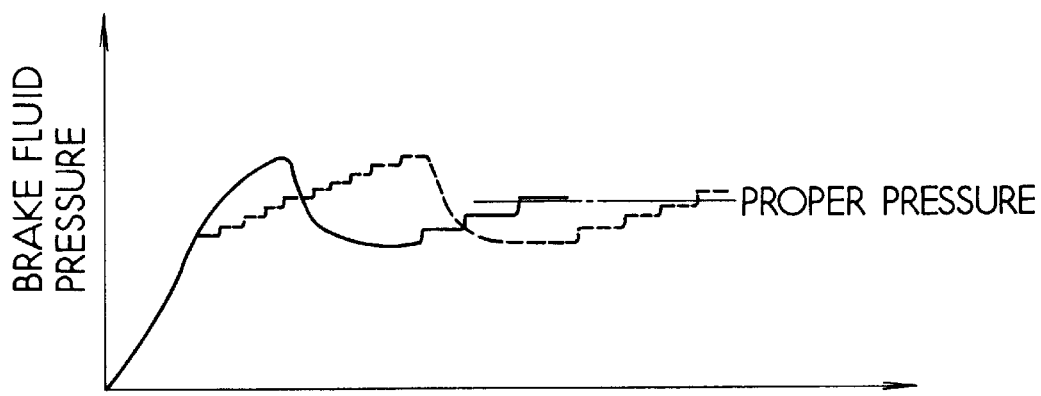
Figure 7C:
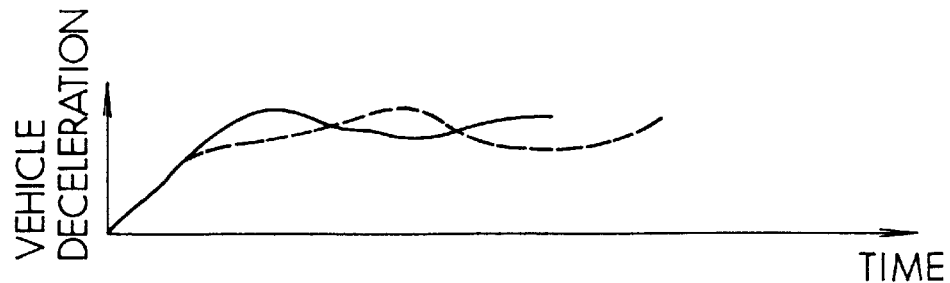

Each timing chart as described above illustrates a case where the maximum wheel speed $V_{Wmax}$ can be used as the estimated body speed $V_O$. Next, a case where all the four wheels slip at the same time will be described. FIGS. 7A to 7C illustrate the control state of the maximum speed wheel in this case.

As indicated by a solid line in FIGS. 7A to 7C, the brake fluid pressure increase in correspondence with the brake pedal depression pressure (the master cylinder pressure) itself is continuously executed for this maximum speed wheel until the ABS control start conditions are satisfied. Here, when the pressure increase rate of the brake fluid pressure of each wheel is reduced referring to the estimated body speed $V_O$ as stated in the Japanese Unexamined Patent Publication No. Hei. 7-101327 (comparative example), the sharp fluid pressure increase control or the gentle fluid pressure increase control is executed for the maximum speed wheel as indicted by a dot line. Therefore, the deceleration becomes gentle, and the driver can not have a good feeling of deceleration. In other words, as the pressure increase rate is not changed for the maximum speed wheel according to this embodiment, the body deceleration becomes large quickly as indicated by a solid line. However, according to the technique stated in the Japanese Unexamined Patent Publication No. Hei. 7-101327, as the pressure increase rate is reduced for the maximum speed wheel, the body deceleration becomes gentle as indicated by a dot line, and thereby the driver has a sense of incongruity as to the deceleration of the whole vehicle.

In this embodiment, it is so constructed that the ABS control start timing is controlled not to be too early by using the maximum speed wheel in particular as the reference and adjusting the brake fluid pressure increase rate with respect to the other wheels. Therefore, even when all the four wheels are apt to slip, as braking is executed always only to one of the four wheels, the driver can have a good feeling of deceleration and the ABS control can start.

FIGS. 7A to 7C illustrate an example of a case where the relative speed relation between the maximum speed wheel and the other wheels remains unchanged until the ABS control starts. However, when the pressure increase is executed only for the maximum speed wheel and the pressure increase restraint is executed for the other wheels and consequently the wheel speed of any one of the other wheels exceeds the wheel speed of the maximum speed wheel, this exceeding wheel becomes the maximum speed wheel in turn, and the pressure increase restraint is no longer executed to the exceeding wheel from the moment of this exceeding.

As described above, normal braking is applied to at least one wheel to secure the deceleration of the vehicle.

So far only the first embodiment of the present invention has been described. It is apparent, however, that the present invention should not be limited to the first embodiment but may be modified in various ways.

For example, in the first embodiment, the ABS control start is determined by comparing each wheel speed $V_W$ with the estimated body speed $V_O$ and the pressure increase restraint control start is determined by comparing the maximum speed wheel and the other wheels. However, it is also acceptable that the ABS control start and the pressure increase restraint control start are determined by comparing each wheel speed $V_W$ with the estimated body speed $V_O$. In this case, however, when a condition that the pressure increase restraint control has already started for the other three wheels by comparing the wheel speed $V_W$ with the estimated body speed $V_O$ has been satisfied, the execution of the pressure increase restraint control is prohibited for the wheel for which the pressure increase restraint control start was last determined. By means of the processing as described above, even if all the four wheels almost concurrently slip, the execution of the pressure increase restraint control is prohibited with respect to at least one wheel, and thereby securing the deceleration of the vehicle is possible.

Furthermore, as the reference value of the ABS control, the wheel speed of the maximum speed wheel $V_{Wmax}$ may be used as the body speed $V_O$. The reason for this is that even if the wheel speed of the maximum speed wheel $V_{Wmax}$ may be used as the body speed $V_O$ in executing the ABS control, serious problems do not occur in normal cases.

Moreover, in the first embodiment of the present invention, the turning direction and the lateral acceleration are taken into consideration and the pressure increase rate is changed based on the determination whether or not the wheel is an inside turning wheel within the turning circle. However, a structure in which the turning direction or the lateral acceleration is not taken into consideration is also acceptable. For example, when only the driving wheels are in chains, the balance of load sharing between the front wheels and the rear wheels is lost when the brake is applied. Even in this case, this modification is sufficiently effective in that too early start of the ABS control of the wheel sharing a smaller portion of the load can be prevented and the sense of incongruity of the driver can be eliminated.

Figure 8:
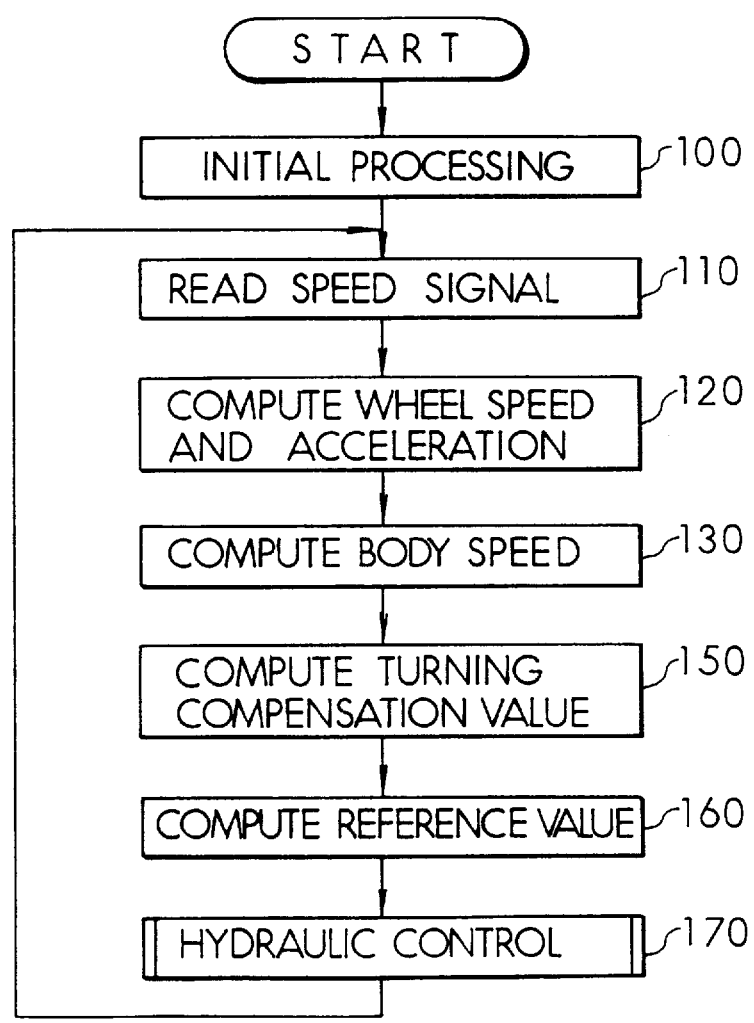
FIG. 8 is a flow chart illustrating the contents of the processing by the main routine of the second embodiment.
Figure 9:
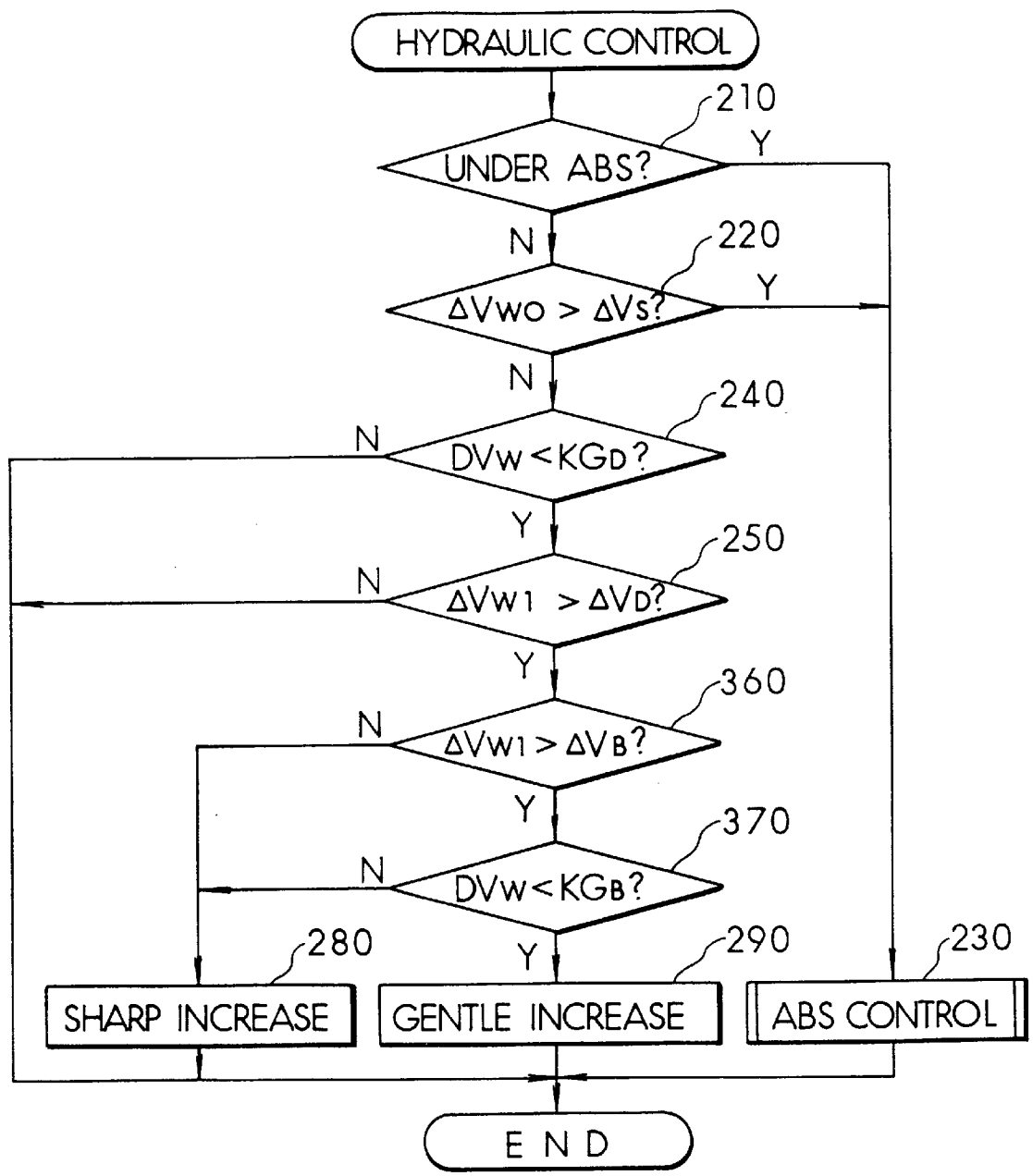
FIG. 9 is a flow chart illustrating the fluid pressure control processing executed in the step 170 of FIG. 8.

Specifically, it is possible to construct the present invention as illustrated in FIGS. 8 and 9.

FIG. 8 will first be described. Compared with FIG. 2 of the first embodiment, the steps 140 has been omitted for there is no need to take the turning, etc. into consideration. The other steps are the same in contents as those of the first embodiment of the present invention.

FIG. 9 will now be described. Here, the processing until the step 250 are the same as those of the first embodiment and the steps after the determination is "YES" in the step 250 are slightly different from those of the first embodiment. That is, when the difference $\Delta V_{W1}$ between the wheel speed of the wheel to be controlled and the wheel speed of the maximum speed wheel is larger than the predetermined value $\Delta V_D$, another determination is made whether $\Delta V_{W1} > \Delta V_B$ has been established (step 360). Here, $\Delta V_B > \Delta V_D$.

When the difference $\Delta V_{W1}$ is equivalent to or smaller than the determination value $\Delta V_B$, the process proceeds to the step 280 to execute the sharp fluid pressure increase control. The contents of the sharp fluid pressure increase control are the same as those of the first embodiment. On the other hand, when it is determined in the step 360 that the difference $\Delta V_W$ is larger than the determination value $\Delta V_B$, another determination is made whether or not the wheel acceleration $DV_W$ of this wheel is smaller than the reference deceleration $KG_B$ set on the negative side further than the reference deceleration $KG_D$ of the step 240 (step 370).

When the determination is "NO" in the step 370, the process proceeds to the step 280 to execute the sharp fluid pressure increase control. On the other hand, when the determination is "YES," the process proceeds to the step 290 to execute the gentle fluid pressure increase control.

By constructing the device in this manner, the brake power increases very slowly by way of the gentle fluid pressure increase control with respect to the wheel having a drastic deceleration against the maximum speed wheel. As a result, the deceleration states of all the wheels are roughly matched with each other in preparation for the ABS control.

Also in the above structure, as the inside turning wheels quickly decelerate in a sharp turning and the determinations in the steps 360 and 370 are apt to be "YES," exactly the same effect as that of the first embodiment can be obtained. Even if there is a wheel which has a very quick deceleration due to some cause while the vehicle is in a straight running, when the sharp fluid pressure increase control and the gentle fluid pressure increase control are used depending on the situation, an accident that either one of the wheels start the ABS control earlier before the body speed gains a sufficient deceleration can exactly be eliminated.

In addition to the above, as the outside front wheel comes to be the maximum speed wheel in many cases as is the case with a sharp turning, the outside turning front wheel may be employed instead of the maximum speed wheel as the adjustment reference wheel for the pressure increase rate before the ABS control starts. Furthermore, it is naturally acceptable that the pressure increase rate is adjusted before the ABS control starts by using the wheel having the weakest locking tendency.

What is claimed is:

1. An automotive antiskid control system for a vehicle having a plurality of wheels, antiskid condition determining means for determining whether each of said plurality of wheels has satisfied conditions to shift to antiskid control responsive to said vehicle being in a braked state, and antiskid controlling means for controlling a deceleration state of each of said plurality of wheels determined to have satisfied said conditions to shift to said antiskid control by adjusting a brake pressure of each of said plurality of wheels, comprising:

pressure increase restraining means for decreasing a brake fluid amount supplied to increase brake pressure with respect to at least one of said plurality of wheels having a first predetermined locking tendency which is smaller than a second predetermined locking tendency sufficient to cause said antiskid controlling means to be actuated by said antiskid condition determining means; and pressure increase restraint prohibiting means for prohibiting a decrease of a brake fluid amount to increase a brake pressure by said pressure increase restraining means with respect to a given one of said plurality of wheels which has reached said first predetermined locking tendency later than another of said plurality of wheels.

2. An automotive antiskid control system according to claim 1, further comprising wheel deceleration obtaining means for detecting or estimating wheel deceleration, wherein said pressure increase restraining means restrains the pressure increase only when the wheel deceleration is equal to or larger than a predetermined wheel deceleration.

3. An automotive antiskid control system according to claim 1, further comprising lateral acceleration obtaining means for detecting or estimating the lateral acceleration of the vehicle, wherein said pressure increase restraining means changes the degree of the pressure increase restraint according to the magnitude of said lateral acceleration.

4. An automotive antiskid control system according to claim 1, further comprising turning direction obtaining means for detecting or estimating a turning direction of the vehicle, wherein said pressure increase restraining means causes the degree of the pressure increase restraint of at least one of said plurality of wheels within a turning circle to be larger than the degree of the pressure increase restraint of at least one of said plurality of wheels outside the turning circle.

5. The automotive antiskid control system according to claim 1, wherein said pressure increase restraint prohibiting means is for supplying said given one of said plurality of wheels with an un-decreased brake fluid amount even after a locking tendency thereof has reached said first predetermined locking tendency.

6. The automotive antiskid control system according to claim 1, wherein each of said pressure increase restraining means and said pressure increase restraint prohibiting means are further for ceasing operation with respect to a wheel when that wheel satisfies said conditions to shift to antiskid control.

7. An automotive antiskid control system for a vehicle having a plurality of wheels, comprising:
   antiskid condition determining means for determining whether each of said plurality of wheels has satisfied conditions to shift to antiskid control responsive to said vehicle being in a braked state;
   antiskid controlling means for controlling a deceleration state of each of said plurality of wheels determined to have satisfied said conditions to shift to said antiskid control by adjusting a brake pressure of each of said plurality of wheels; and
   pressure increase restraining means for decreasing a brake fluid amount supplied to increase a brake pressure with respect to each of said plurality of wheels of which a difference in locking tendency from a reference wheel having a weakest locking tendency among all the plurality of wheels satisfies said conditions to shift to said antiskid control, and for prohibiting said decreasing when said difference is less than said predetermined value.

8. An automotive antiskid control system according to claim 7, further comprising wheel deceleration obtaining means for detecting or estimating the wheel deceleration, wherein said pressure increase restraining means restrains the pressure increase only when the wheel deceleration is equal to or larger than a predetermined wheel deceleration.

9. An automotive antiskid control system according to claim 7, further comprising lateral acceleration obtaining means for detecting or estimating the lateral acceleration of the vehicle, wherein said pressure increase restraining means changes the degree of the pressure increase restraint according to the magnitude of said lateral acceleration.

10. An automotive antiskid control system according to claim 7, further comprising turning direction obtaining means for detecting or estimating a turning direction of the vehicle, wherein said pressure increase restraining means causes the degree of the pressure increase restraint of at least one of said plurality of wheels within a turning circle to be larger than the degree of the pressure increase restraint of at least one of said plurality of wheels outside the turning circle.

11. The automotive antiskid control system according to claim 7, wherein said pressure increase restraining means is for supplying said reference wheel with an un-decreased amount of brake fluid until antiskid control is started.

12. The automotive antiskid control system according to claim 7, wherein said pressure increase restraining means is further for ceasing operation with respect to a given one of said wheels when that given wheel satisfies said conditions to shift to antiskid control.

13. An automotive antiskid control system for a vehicle having a plurality of wheels, antiskid condition determining means for determining whether each of said plurality of wheels has satisfied conditions to shift to antiskid control responsive to said vehicle being in a braked state and antiskid controlling means for controlling a deceleration state of each of said plurality of wheels determined to have satisfied said conditions to shift to said antiskid control by adjusting a brake pressure of each of said plurality of wheels, comprising:
   wheel speed detecting means for detecting a rotational speed of each of said plurality of wheels; and
   pressure increase restraining means for decreasing a brake fluid amount supplied to increase brake pressure with respect to each of said plurality of wheels in which a difference in rotational speed from a reference wheel having a maximum rotational speed among said plurality of wheels is at least at a predetermined value until each of said plurality of wheels satisfies the conditions to shift to said antiskid control, and for prohibiting said decreasing when said difference is less than said predetermined value.

14. An automotive antiskid control system according to claim 13, further comprising body speed obtaining means for detecting or estimating a body speed, wherein said antiskid condition determining means determines whether each of said plurality of wheels has satisfied the conditions to shift to the antiskid control based on a difference between said body speed and the rotational speed of each wheel and said antiskid control means adjusts the brake pressure so that the difference therebetween matches with a predetermined value.

15. An automotive antiskid control system according to claim 13, further comprising wheel deceleration obtaining means for detecting or estimating the wheel deceleration, wherein said pressure increase restraining means restrains the pressure increase only when the wheel deceleration is equal to or larger than a predetermined wheel deceleration.

16. An automotive antiskid control system according to claim 13, further comprising lateral acceleration obtaining means for detecting or estimating the lateral acceleration of the vehicle, wherein said pressure increase restraining means changes the degree of the pressure increase restraint according to the magnitude of said lateral acceleration.

17. An automotive antiskid control system according to claim 13, further comprising turning direction obtaining means for detecting or estimating a turning direction of the vehicle, wherein said pressure increase restraining means causes the degree of the pressure increase restraint of at least one of said plurality of wheels within a turning circle to be larger than the degree of the pressure increase restraint of at least one of said plurality of wheels outside the turning circle.

18. The automotive antiskid control system according to claim 13, wherein said pressure increase restraining means is for supplying said reference wheel with an un-decreased amount of brake fluid until antiskid control is started.

19. The automotive antiskid control system according to claim 13, wherein said pressure increase restraining means is further for ceasing operation with respect to a given one of said wheels when that given wheel satisfies said conditions to shift to antiskid control.

20. An automotive antiskid control system for a vehicle having a plurality of wheels, comprising:
   antiskid condition determining means for determining whether each of said plurality of wheels has satisfied conditions to shift to antiskid control responsive to said vehicle being in a braked state;
   antiskid controlling means for controlling a deceleration state of each of said plurality of wheels determined to have satisfied conditions to shift to said antiskid control by adjusting brake pressure of each of said plurality of wheels;
   turning direction obtaining means for at least one of detecting and estimating a turning direction of the vehicle; and
   pressure increase restraining means for decreasing an amount of brake fluid supplied to increase brake pressure with respect to each of said plurality of wheels other than a reference wheel which is a front wheel outside a turning circle and which is determined based on the turning direction of the vehicle until each of said plurality of wheels satisfies said conditions to shift to said antiskid control.

21. An automotive antiskid control system according to claim 20, further comprising wheel speed detecting means for detecting a rotational speed of each of said plurality of wheels, wherein said pressure increase restraining means restrains a pressure increase only if there is a difference in rotational speeds between said reference wheel and another of said plurality of wheels.

22. An automotive antiskid control system according to claim 20, wherein said pressure increase restraining means causes a degree of said pressure increase restraint of at least one of said plurality of wheels within said turning circle to be larger than said degree of said pressure increase restraint of a rear wheel outside said turning circle.

23. The automotive antiskid control system according to claim 20, wherein said pressure increase restraining means is for supplying said reference wheel with an un-decreased amount of brake fluid until antiskid control is started.

24. The automotive antiskid control system according to claim 20, wherein said pressure increase restraining means is further for ceasing operation with respect to a given one of said wheels when that given wheel satisfies said conditions to shift to antiskid control.

25. An automotive antiskid control system for a vehicle having a plurality of wheels, comprising:
   antiskid condition determining means for determining whether each of said plurality of wheels has satisfied conditions to shift to antiskid control responsive to said vehicle being in a braked state;
   antiskid controlling means for controlling a deceleration state of each of said plurality of wheels determined to have satisfied said conditions to shift to antiskid control by adjusting a brake pressure of each of said plurality of wheels;
   wheel speed detecting means for detecting a rotational speed of each of said plurality of wheels;
   body speed obtaining means for detecting or estimating a vehicle body speed;
   setting means for setting a higher reference speed and a lower reference speed based on said vehicle body speed, said lower reference speed being utilized as one of said conditions to shift to antiskid control;
   pressure increase restraining means for restraining a brake pressure increase with respect to at least one of said plurality of wheels having a wheel speed not higher than said higher reference speed; and
   pressure increase restraint prohibiting means for prohibiting brake pressure increase restraint by said pressure increase restraining means with respect to a given one of said plurality of wheels which has reached said higher reference speed later than another of said plurality of wheels.

26. The automotive antiskid control system according to claim 25, wherein said pressure increase restraint prohibiting means is for supplying said given one of said plurality of wheels with an un-decreased brake fluid amount even after a locking tendency thereof has reached said first predetermined locking tendency.

27. The automotive antiskid control system according to claim 25, wherein each of said pressure increase restraining means and said pressure increase restraint prohibiting means are further for ceasing operation with respect to a wheel when that wheel satisfies said conditions to shift to antiskid control.

* * * * *